Patented Oct. 3, 1950

2,524,054

UNITED STATES PATENT OFFICE 2,524,054

PREPARATION OF GUANIDINE SALTS

William H. Hill, Pittsburgh, Pa., assignor to Koppers Company, Inc., Pittsburgh, Pa., a corporation of Delaware No Drawing. Application June 17, 1947,
Serial No. 755,237

8 Claims. (Cl. 260—564)

The present invention relates to an improved process for the preparation of guanidine and guanidine salts from ammonium thiocyanate. The present application is a continuation in part of inventor's application, Serial No. 548,635, filed Aug. 8, 1944, now abandoned.

When ammonium thiocyanate is fused and heated at a temperature of about 180° C., the mass is converted by prolonged heating to guanidine thiocyanate and hydrogen sulfide is evolved. The reaction, which is well known, proceeds according to the equation:

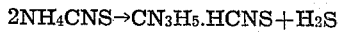

$$2NH_4CNS \rightarrow CN_3H_5.HCNS + H_2S$$

This equation illustrates the fact that two mols of ammonium thiocyanate are required to produce one mol of the guanidine salt and, therefore, upon the basis of the mol weight of ammonium thiocyanate employed a theoretical yield of 50% by mol weight of guanidine compound can be obtained. It was further recognized in the prior art that the reaction shown above does not proceed quantitatively either because some of the hydrogen sulfide remains in the melt and inhibits the progress of the reaction to the right or because undesirable side reactions occur between hydrogen sulfide and further quantities of ammonium thiocyanate causing decomposition of the latter with evolution of carbon disulfide. Wilhelm Gluud, in U. S. 1,902,400, obtained a substantial increase in the yields from the process by introducing gaseous ammonia into the reaction mass and therewith sweeping hydrogen sulfide from the melt. The Gluud process provided improvement over the former expedient of employing heavy metals to react with the hydrogen sulfide, as is pointed out in the aforesaid patent, but, of course, the problem of the evolution of hydrogen sulfide, a highly noxious gas, still remained and furthermore two mols of ammonium thiocyanate were still required to produce one mol of guanidine salt.

An object of the present invention is to provide a novel process for promoting the conversion of ammonium thiocyanate to guanidine by fusion of ammonium thiocyanate at an elevated temperature.

Another object of the invention is to provide a novel process for obtaining said conversion without the disadvantageous evolution of hydrogen sulfide experienced in the prior art.

A further object of invention is to provide a novel process whereby enhanced yields of guanidine can be obtained in a single fusion step in relatively short reaction times from ammonium thiocyanate.

The invention has for further objects such other improvements and such other operative advantages or results as may be found to obtain in the processes or apparatus hereinafter described or claimed.

According to the present invention, ammonium thiocyanate, or its isomer, thiourea, is fused with a sulfuric acid derivative such as sulfamide, sulfimide, and alkali or alkaline earth metal salts of sulfamic acid or imido-disulfonic acid. The selected compound reacts with the ammonium thiocyanate in molten admixture therewith, and oxidizes the sulfur of the thiocyanate radical to elemental sulfur which separates out of the melt. The product of the reaction is a guanidine salt or a mixture of guanidine salts which can be readily converted to free guanidine or known guanidine salts.

The said sulfuric acid derivatives constitute the class of compounds produced by successive replacement of hydroxyl groups in sulfuric acid by the amino group as defined in Degering "An Outline of Organic Nitrogen Compounds," page 477, paragraph 1429. The initial compound of the series is sulfamic acid $H_2N.SO_2OH$, which series in addition includes imidodisulfonic acid, and sulfamide and sulfimide.

In the claims the term "alkali metal" is intended to include the $NH_4$ group.

Either ammonium thiocyanate or thiourea can be employed as the starting material in the reaction. Thiourea is produced by heating ammonium thiocyanate and this conversion probably occurs initially when the present reaction is carried out. The employment in the fusion melt of one of the above compounds with ammonium thiocyanate provides remarkably enhanced yields probably because in the reaction melt the amino groups of the aforementioned sulfuric acid derivatives supply ammonia to the formation of the guanidine and consequently from one mol of ammonium thiocyanate a theoretical yield constituting one mol of guanidine salts can be obtained. Furthermore, the hydrogen sulfide, previously evolved when ammonium thiocyanate is heated, is in this new process by the action of the said sulfuric acid derivatives oxidized to elemental sulfur which is insoluble in the melt. Consequently, the disadvantageous evolution of hydrogen sulfide, and the undesirable inhibition of the progress of the reaction to completion that was formerly caused by the presence of dissolved hydrogen sulfide, are eliminated.

For example, such compounds as sulfamide ($SO_2(NH_2)_2$), alkali sulfamates such as ammonium sulfamate ($NH_4OSO_2NH_2$), sodium sulfamate ($NaOSO_2NH_2$), and potassium sulfamate $$(KOSO_2NH_2)$$

and ammonium imidodisulfonate $$(HN(SO_2ONH_4)_2)$$

have been found of special utility for providing improved yields of guanidine according to the present improvement.

In the conversion reaction products, the guanidine is found in combination with sulfur-oxygen acid radicals, thus making available for conversion to guanidine that thiocyanate radical which heretofore has always been found in combination with the guanidine when ammonium thiocyanate is heated alone.

Advantageously the conversion reaction of ammonium thiocyanate with derivatives of the aforementioned type proceeds with substantially no evolution of the usual hydrogen sulfide from the reaction mixture and furthermore there is exhibited by their use a surprising increase in the velocity of formation of guanidine and, thus in a given reaction time, an important increase in yield of guanidine is recoverable from a given quantity of the employed thiocyanate. As a by-product, instead of hydrogen sulfide, elemental sulfur appears in the reaction product.

The ratio of reactants practicably employable in the present invention can be varied considerably, and can be used to effect corresponding variations in reaction phenomena and yield. In general, it can be said that it is preferred to use about equimolar ratios of ammonium thiocyanate and an aforesaid compound; in the case of ammonium sulfamate, in particular, it has been found that more than one mole of ammonium sulfamate makes possible the reduction of the reaction temperature or the reaction time that is required to produce a given degree of conversion of ammonium thiocyanate in a single heating step. By the use of ammonium sulfamate, homogeneous melts can be produced at low temperature so that before a substantial conversion of ammonium thiocyanate is initiated, the reaction mixture is substantially homogeneous in composition. When the molar ratio of ammonium sulfamate to ammonium thiocyanate in the admixture is about 2:1 a homogeneous melt is obtained at a temperature as low as 80° C. At the preferred temperature of reaction, 190° C., if a mixture of ammonium sulfamate and ammonium thiocyanate is heated for eleven hours, and the molar proportion of ammonium sulfamate to ammonium thiocyanate is 1¼:1 instead of in molar equivalency, the yield of recoverable guanidine is substantially fifteen percent greater than with a molar ratio of 1:1, and the decrease of residual ammonium thiocyanate in the resultant mixture is substantially thirty percent.

The reactions of the present invention are exothermic and the evolved heat must be adequately removed from the reaction mixture by appropriate means if the reaction temperatures are to be closely controlled. For example, if a mixture of ammonium thiocyanate and ammonium sulfamate is heated to an initial temperature of 180° C., the reaction temperature can quickly rise to about 250° C. and the reaction can be substantially complete in a few minutes. At temperatures above 200° C., however, the guanidine content of the reaction mixture obtained by the conversion reaction begins to convert to triazines and it is thus desirable when guanidine is the only preferred product, to maintain the reaction melt at below about 200° C. The higher temperatures can give rise to excessive decomposition of sulfamate which is unproductive of guanidine.

Other things being equal, the rate at which equilibrium is attained in the reaction mixture depends, to a pronounced degree, on the temperature of reaction. For example, equal quantities of a given admixture of ammonium thiocyanate and ammonium sulfamate were separately heated at a conversion temperature; the one to 160° C. for eleven hours, and the other to 190° C. for one hour and a half. The conversions of ammonium thiocyanate in both instances were substantially equal. Continued heating of the latter mixture at 190° C. for eleven hours gave a yield of approximately ninety-five percent of guanidine based on the weight of ammonium thiocyanate employed One of the advantages of the present improvement resides in the fact that homogeneous, fused mixtures of ammonium thiocyante and an aforesaid reactant can be provided at temperatures as low as 80° C. thereby avoiding the obvious disadvantages of reacting mixed reactants that are in heterogeneous admixture. For any specific application, therefore, of the present improvement, the employed temperature of heating resides within the skill of the art and can depend upon the preferred rate of conversion, degree of conversion, and the temperature attainable in existing equipment after fusion is attained.

As aforementioned, the guanidine content of the reaction products obtained is combined with acid in the form of a salt or salts. The precise constitution of the acid radicals is not known, but it has been determined that they are acids of oxides of sulfur. It is believed that the reaction product, when ammonium sulfamate is employed, is guanidine sulfinate, and that, in other instances, similar reduced sulfur-oxygen-amine radicals form the acid radical. However, inasmuch as these acid radicals are unstable or are readily convertible to known salts such as sulfates, and as the guanidine radical is obviously the one of importance in guanidine production, the process is not limited to a delineation of any particular acid radical.

The product of reaction is useful directly as a concentrated fertilizer; it is especially valuable where a slower delivery of nitrogen to the soil is desired than that delivery provided by ammonium salts or urea. The elemental sulfur in the said reaction-product is particularly useful in the treatment and fertilizing of alkali soils and in the control of fungi and soil-borne diseases. The sulfur can be maintained by agitating means in uniform dispersion throughout the melt during its cooling down to temperature of solidification. The aqueous extract is useful also by virtue of its guanidine content as an ingredient in fireproofing agents and as an intermediate in the preparation of dyestuffs, explosives, leather chemicals and pharmaceuticals.

Guanidine in salt form is readily obtainable from the reaction-products of ammonium thiocyanate and the aforementioned reactants by leaching them with water thereby forming aqueous solutions of guanidine salts that also contain soluble ammonium or other alkali salts. When the leaching is carried out with warm water, the so-formed solution contains guanidine sulfate and bisulfate, (the guanidine sulfinate apparently decomposing in the same manner as ammonium sulfinate or amidosulfite in which case "much sulphate" is formed. Cf. Divers and Ogawa J. C. S., vol. 77, p. 327 or p. 335) and, in addition, some ammonium or other alkali sulfate, depending upon the above reactant employed. The solution is then treated with limited quantities of alkaline-earth metal oxide or hydroxide under conditions to remove substantially only all the free or combined ammonia from the leached solution and to precipitate only alkaline-earth metal sulfates and sulfites if present. So-treated solution contains after filtration or centrifugalization substantially only guanidine sulfate, which can by customary methods, such as evaporation, or the like, be readily recovered therefrom.

In the preparation of other guanidine salts from the said guanidine sulfate solution by double decomposition, preferably a sodium salt of the desired anion to be combined with the guanidine is employed so as to take advantage, in the recovery of the said other salt by fractional crystallization, of the decreasing solubility of sodium sulfate with increase in temperature.

Free guanidine can be liberated from the said guanidine sulfate solution by treating the same with a base of greater alkalinity than guanidine, such as an alkali metal hydroxide.

The following equation is given to illustrate the summation of the reactions believed to occur when ammonium thiocyanate and ammonium sulfamate are reacted according to the invention, and to serve as a basis for calculating the yields obtained in the following specific examples:

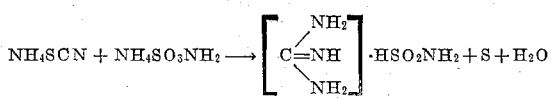

The guanidine amido sulfinate which is assumed to be the reaction product in the above empirical equation is apparently unstable; in any event, upon leaching, the reaction product is guanidine sulfate, the oxidation of the unstable sulfite compound apparently being effected by the presence of air during leaching as is noted for example in Ephraim, Inorganic Chemistry 4th Ed., p. 563 or in the aforesaid J. C. S. reference.

In the above discussion of the present improvement, reference has been made only to ammonium thiocyanate as the source of guanidine. The described processes are, however, applicable to thiourea as the starting material and also to mixtures of thiourea and ammonium thiocyanate of which both give substantially the same yields of guanidine.

The following examples serve to illustrate the present invention but in no instance are intended to limit the same.

EXAMPLE 1

In each of six test tubes a sample of a mix containing by weight 98 parts of $NH_4SO_3NH_2$ and 52 parts of $NH_4SCN$ (a molar ratio of, respectively, 1¼:1) was heated in an oil bath maintained at 190° C. During the period of reaction the contents of each were stirred. After a reaction period of 1, 3, 5, 7, 9 and 11 hours, a test tube was removed from the bath, and the loss of material by vaporization of volatile products was determined. There was no evolution of $H_2S$ thus indicating that an oxidation of the sulfur had occurred.

The products in each case were leached with water and the undissolved portion was considered as sulfur, although a small amount of triazines might have been included therewith. The dissolved material was analyzed for guanidine. The Table 1 hereinbelow recorded gives the content of the stated products of the six samples.

Table 1

| Numbers of hours of the reaction | 1 | 3 | 5 | 7 | 9 | 11 |
|---|---|---|---|---|---|---|
| Guanidine, parts by weight | 16 | 29.5 | 32.8 | 35.2 | 36.2 | 37.5 |
| Guanidine, per cent of theory, based on mol. wt. of $NH_4SCN$ used | 40 | 74 | 82 | 87 | 91 | 94 |
| Sulfur, and other insolubles, parts by weight | 11.5 | 20.4 | 22.2 | 24.0 | 25.0 | 26.0 |

From inspection of the above table it can be seen that 94% of theoretical yield of guanidine was obtained after retention of the ammonium thiocyanate and ammonium sulfamate melt at 190° C. for eleven hours.

EXAMPLE 2

76 parts of $NH_4SCN$ and 228 parts of $NH_4SO_3NH_2$ by weight were heated and reacted in an open vessel. A thin, clear, bluish melt was obtained at about 90° C., the color being due to elemental sulfur colloidally dispersed in the melt; at about 150° C. the melt became colorless and contained a cloudy suspension. At about 170° C. yellow sulfur appeared, and at about 210° C. the rate of reaction and of temperature rise became accelerated and the temperature rose abruptly to 245° C. Total reaction time was about 10 minutes. There was no evolution of hydrogen sulfide.

Analysis of the aqueous solution produced by leaching showed that 44 parts of guanidine had been formed, or 75% of theoretical yield, based on the weight of $NH_4SCN$ employed. About 17% of the original ammonium thiocyanate remained unreacted in the solution.

EXAMPLE 3

By weight, 60 parts of thiourea and 90 parts of ammonium sulfamate (molar ratio of 1:1) were heated and reacted together for five hours in a glass vessel immersed in an oil bath maintained at 190° C. No evolution of hydrogen sulfide was observed. The reaction product was then cooled and leached with water leaving elemental sulfur as residue. The aqueous solution so obtained was analyzed for its guanidine content which was 69.2% of theoretical yield based on the weight of thiourea employed. The elemental sulfur residue was 17.1% by weight of the employed admixture.

EXAMPLE 4

By weight, 58.5 parts of ammonium thiocyanate and 91.5 parts of sodium sulfamate (molar ratio 1:1) were heated and reacted together according to the procedure described in Example 3. No evolution of hydrogen sulfide was observed. The aqueous solution obtained by leaching the reaction product with water showed that 61.8% of theoretical yield of guanidine based on the employed weight of ammonium thiocyanate was obtained. The elemental sulfur residue was 14.8% by weight of the employed admixture.

EXAMPLE 5

By weight, 22.1 parts of ammonium thiocyanate and 61.3 parts of ammonium imidodisulfonate (molar ratio of 1:1) were heated and reacted together according to the procedure described in Example 3. No evolution of hydrogen sulfide was observed. The aqueous solution obtained by leaching contained 73.1% of theoretical yield of guanidine based on the weight of ammonium thiocyanate employed. The elemental sulfur residue was 11.7% by weight of the employed admixture.

EXAMPLE 6

By weight, 47.5 parts of ammonium thiocyanate and 60 parts of sulfamide (molar ratio of 1:1) were heated together according to the procedure described in Example 3. No evolution of hydrogen sulfide was observed. 70.4% of theoretical yield of guanidine based on the employed weight of ammonium thiocyanate was obtained. The elemental sulfur residue was 19.8% by weight of the employed admixture.

EXAMPLE 7

By weight, 60 parts of ammonium thiocyanate and 90 parts of ammonium sulfamate (molar ratio of 1:1) were heated together according to the procedure described in Example 3. No evolution of hydrogen sulfide was observed. The aqueous solution obtained by leaching the reaction product with water showed that 64.1% of theoretical yield of guanidine based on the employed weight of ammonium thiocyanate was obtained. The elemental sulfur residue was 15.5% by weight of the employed admixture.

EXAMPLE 8

By weight, 51 parts of ammonium thiocyanate and 99 parts of crude ammonium sulfamate, containing about 80% ammonium sulfamate and 20% ammonium sulfate (net molar ratio of the first two compounds was 1:1) were heated and reacted together according to the procedure described in Example 3. No evolution of hydrogen sulfide was observed. 64.8% of theoretical yield of guanidine based on the employed weight of ammonium thiocyanate was obtained. The elemental sulfur residue was 13.7% by weight of the employed admixture.

EXAMPLE 9

A mixture of 114 parts and 223 parts by weight, respectively, of ammonium thiocyanate and the crude ammonium sulfamate described in Example 8 were heated to 110° C. forming thereby a thin melt. The ammonium sulfate was removed by filtering in a hot funnel and the filtrate was cooled. 150 grams of the cooled filtrate, having a molar ratio of 1:1 of thiocyanate to net sulfamate, were reacted according to the procedure described in Example 3. No evolution of hydrogen sulfide was observed. 60.2% of theoretical yield of guanidine based on the employed weight of ammonium thiocyanate was obtained. The elemental sulfur was 14.7% by weight of the employed cooled filtrate.

EXAMPLE 10

As a further example in the preparation of guanidine compound according to the present invention, a series of tests was run in each instance of which 114 grams of ammonium sulfamate were heated in molten admixture with 76 grams of ammonium thiocyanate at varying temperatures and for periods of one, three and five hours. The melts were reacted for the three time periods at temperatures of 180° C., 200° C., and 210° C. In no instance was any evolution of hydrogen sulfide detected. In all cases produced insoluble solids were separated from a filtrate consisting of an aqueous solution of the obtained guanidine salt. The solids were analyzed for sulfur and nitrogen, which is hereinafter reported also as percent triazines calculated as melamine inasmuch as it is the leading member of the series of triazines adventitiously produced by the reaction.

| Time, Hrs. | Temp., °C. | Insolubles, Wt. in Gms. | Analyses of Insolubles | | | Yield, Sulfur, Per Cent of Theory |
|---|---|---|---|---|---|---|
| | | | Nitrogen, Per Cent by Weight | Triazines (Calc.), Per Cent by Weight | Sulfur, Per Cent by Weight | |
| 1 | 180 | 4.9 | 0.054 | 0.08 | 94.81 | 14.5 |
| 3 | 180 | 11.2 | 0.105 | 0.16 | 94.40 | 33.0 |
| 5 | 180 | 19.0 | 0.190 | 0.29 | 98.45 | 58.4 |
| 1 | 200 | 20.8 | 0.238 | 0.36 | 97.45 | 63.3 |
| 3 | 200 | 23.9 | 0.808 | 1.21 | 96.67 | 75.2 |
| 5 | 200 | 26.4 | 1.45 | 2.18 | 96.64 | 79.7 |
| 1 | 210 | 25.0 | 2.14 | 3.21 | 93.93 | 73.3 |
| 3 | 210 | 27.3 | 4.30 | 6.45 | 93.15 | 79.5 |
| 5 | 210 | 28.6 | 4.86 | 7.29 | 91.33 | 81.5 |

It is noted from the above table that the production of elemental sulfur provides an index of the progress of the reaction. It is further observed that after five hours of reaction at a temperature of 210°, a yield of 81.5% of the theoretical weight of sulfur is obtained. In addition to demonstrating the progress of the reaction at different temperatures over different time periods the performed analyses prove that the solid which is produced is elemental sulfur. The presence of elemental sulfur, in turn, necessarily demands the reduction of another reactant in order to provide for the oxidation of thiocyanate sulfur to elemental sulfur and therefore supports the assumption that the sulfuric acid derivative employed is reduced to a sulfur-oxygen compound of a lower stage of oxidation.

It is noted that in the above specific examples the guanidine obtained could not possibly have resulted from a thermal decomposition of ammonium thiocyanate alone, because in every instance the yield of guandine is over 50% and is, therefore, higher than the maximum yield obtainable from heating ammonium thiocyanate alone.

In the claims, the starting material of the reaction is ammonium thiocyanate. As is well known in the art, when ammonium thiocyanate is heated, thiourea, an isomer of thiocyanate is initially formed. Therefore, it is understood that in carrying out the process of the present invention the reacting of thiourea, which can find its source elsewhere than in ammonium thiocyanate, is an obvious equivalent to the reacting of ammonium thiocyanate as expressly set forth in the claims.

Many additional products of the reaction of the present invention can be produced by changing the conditions employed, especially the temperature. Such compounds producible by increasing the temperature of reaction can be biguanid, melamine, melam, melem, melon, ammeline, ammelide, thioammeline, and thioammelide.

The invention as hereinabove set forth is embodied in particular form and manner but may be variously embodied within the scope of the claims hereinafter made.

I claim:
1. An improved process of converting ammonium thiocyanate to guanidine-containing salt comprising: heating a mixture consisting essentially of ammonium thiocyanate at a temperature between 80° and 245° C. while in contact with a compound selected from the group consisting of alkali metal sulfamates, alkali metal imido-disulfonates, and sulfamide.

2. In a process of converting ammonium thiocyanate to guanidine-containing salt, heating a mixture consisting essentially of ammonium thiocyanate with sufficient ammonium sulfamate as substantially to liquefy their admixture at a temperature of about 80° C., and continuing the heating within the temperature range of about 150° to 200° C. and thereby effecting reaction therebetween and forming guanidine salt of a sulfur-oxygen acid in the liquefied admixture.

3. An improved process of converting ammonium thiocyanate to guanidine-containing salt comprising heating and reacting a mixture consisting essentially of ammonium thiocyanate and ammonium sulfamate within the temperature range of 150° to 200° C. to form a reaction product comprising guanidine salt of a sulfur-oxygen acid.

4. A process of converting ammonium thiocyanate to a guanidine sulfate comprising: heating and reacting ammonium thiocyanate at a temperature between 80° and 245° C. with a compound selected from the group consisting of alkali metal sulfamates, alkali metal imido-disulfonates and sulfamide, treating the resulting reaction product with warm water and forming an aqueous solution of guanidine sulfates in contact with insoluble residue, separating so-formed aqueous solution from insoluble residue, adding to the so-separated aqueous solution an inorganic alkali base in quantity to form a mildly alkaline solution to convert any guanidine bisulfate present to the sulfate, driving off the free or combined ammonia from the so-treated solution while precipitating as alkali salts the sulfates formerly present in forms other than guanidine sulfate, and separating the so-formed precipitate from the aqueous solution of guanidine sulfate.

5. A process as claimed in claim 1 and wherein the said reactants are in the molecular ratio of substantially 1:1.

6. A process as defined in claim 1 wherein the selected compound is sulfamide.

7. The process defined in claim 1 in which the selected compound is an alkali metal sulfamate.

8. The process defined in claim 1 in which ammonium thiocyanate and the selected compound are reacted in the molar ratio of substantially one and one-quarter to one.

WILLIAM H. HILL.

REFERENCES CITED

The following references are of record in the file of this patent:

UNITED STATES PATENTS

| Number | Name | Date |
| --- | --- | --- |
| 2,262,935 | Hill et al. | Nov. 18, 1941 |
| 2,265,942 | Hill | Dec. 9, 1941 |
| 2,334,151 | Thurston | Nov. 9, 1943 |